US011895985B2

(12) United States Patent
Crown

(10) Patent No.: US 11,895,985 B2
(45) Date of Patent: Feb. 13, 2024

(54) SUSPENSION ASSEMBLY FOR EXERCISING AND TRAINING ANIMALS

(71) Applicant: CROWN FAMILY GROUP PTY LTD, Smithfield (AU)

(72) Inventor: Gavin Natan Crown, Smithfield (AU)

(73) Assignee: CROWN FAMILY GROUP PTY LTD, Smithfield (AU)

( * ) Notice: Subject to any disclaimer, the term of this patent is extended or adjusted under 35 U.S.C. 154(b) by 281 days.

(21) Appl. No.: 17/451,891

(22) Filed: Oct. 22, 2021

(65) Prior Publication Data
US 2022/0125015 A1 Apr. 28, 2022

(30) Foreign Application Priority Data
Oct. 23, 2020 (AU) ................................ 2020102975

(51) Int. Cl.
*A01K 15/02* (2006.01)
(52) U.S. Cl.
CPC .................................. *A01K 15/027* (2013.01)
(58) Field of Classification Search
CPC ............................ A01K 15/027; A01K 1/0613
USPC ....................................................... 119/728
See application file for complete search history.

(56) References Cited

U.S. PATENT DOCUMENTS

| 7,806,089 | B2* | 10/2010 | Walker-Indyke | .... A01K 13/001 119/753 |
| 7,806,755 | B1* | 10/2010 | Martinelli | ................ A22B 5/06 452/187 |
| 10,721,911 | B2* | 7/2020 | Cassell | ................ A01K 13/003 |
| 10,863,723 | B2* | 12/2020 | Graumann | ........... A61G 7/1046 |
| 11,246,294 | B2* | 2/2022 | Dyson | ...................... A61D 3/00 |
| 2009/0126650 | A1* | 5/2009 | Walker-Indyke | ...... A01K 15/00 119/756 |

OTHER PUBLICATIONS

"So Fly: Fitdog Friday: How to Make a Spring Pole", mylifewithflyballdogs.blogspot.com/2013/05/fitdog-friday-how-to-make-spring-pole.html?spref=pi, 8 pages, May 24, 2013.
GRC Dogsports, "Gameness, Relationship, Control: Dogsports", 27 pages, 2020.

* cited by examiner

*Primary Examiner* — Todd M Epps
(74) *Attorney, Agent, or Firm* — McKee, Voorhees & Sease, PLC

(57) ABSTRACT

Suspension assembly (100) for exercising and training animals, and especially canines using a suspended tug toy (200). Assembly (100) comprises an upper member (110) and a plurality of legs (120, 130, 140, 150) extending therefrom. Each of the plurality of legs is collapsible. Assembly (100) comprises one or more guide (160) for an associated tether line (300) for suspending tug toy (200). Guide (160) is connected relative to upper member (110) and defines an aperture (162) for receiving tether line (300). When assembly (100) is installed on a surface (400), legs (120, 130, 140, 150) engage with the surface via an associated pivotable foot (122, 132, 142, 152) and elevate upper member (110) and guide (160) from surface (400). Guides (170) for tether line (300) are connected relative to leg (120) and define an aperture (172) for receiving tether line (300).

16 Claims, 2 Drawing Sheets

SUSPENSION ASSEMBLY FOR EXERCISING AND TRAINING ANIMALS

CROSS-REFERENCE

This application claims priority from Australian Patent Application No. 2020102975, entitled "Suspension Assembly for Exercising and Training Animals", which was filed on Oct. 23, 2020 and published under publication number AU 2020102975 A4 on Dec. 24, 2020, the contents of which are incorporated herein in their entirety by way of reference.

TECHNICAL FIELD

The present disclosure relates to a suspension assembly, in particular a suspension assembly for exercising and training animals.

BACKGROUND

Poorly trained and exercised animals, in particular canines, are a significant social issue. A poorly trained and exercised canine, left to their own devices, may lead to the destruction of property, the creation of noise pollution, and physical attacks upon other animals or people.

The use of training tools assists with the reduction of negative canine incidents and provides opportunity for additional benefits, such as strength training, socialising, and improved problem solving.

Tug toys, such as spring poles, are an interactive way of engaging a canine in training and exercise activities. A suspended tug toy encourages the canine to jump, in order to reach the toy, and latch onto the toy to hang onto it with part or all of their body hanging off the ground. However, typical methods of suspending the tug toy vertically from an overhead branch or fixed frame may lead to dangerous situations, such as the branch suddenly breaking when the canine is hanging from the tug toy or the canine swinging into and impacting against a support element of the frame.

Another problem with known tug toy suspension apparatus is that they are fixed in place. Accordingly, the suspension apparatus is not readily portable, such as is advantageous if a user wishes to set up a temporary suspended tug toy for a canine strength and agility event or training course.

Another deficiency with known tug toy suspension apparatus is a mechanism for quickly and safely lowering the tug toy, as may be necessary, for example, if a dog refuses to release the suspended tug toy.

Various embodiments in accordance with the present disclosure seek to provide a suspension frame configured to facilitate safe adjustment of the tug toy during canine exercise and training activities.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Throughout this specification:
the word "comprise", and variations such as "comprises" or "comprising", will be understood to imply the inclusion of a stated element, integer or step, or group of elements, integers or steps, but not the exclusion of any other element, integer or step, or group of elements, integers or steps;
the word "collapsible", and variations such as "collapse", will be understood as implying that the item referred to is "reducible in size", such as by folding, telescoping or separating into sub-components; and
the term "tug toy" will be understood as meaning any item that is suitable to be tugged on whilst being clenched by the jaws of an animal.

Disclosed herein is a suspension assembly for exercising and training animals, the suspension assembly comprising:
at least one upper member;
a plurality of legs extending from the at least one upper member, each of the plurality of legs being collapsible;
a first guide for a first tether line, the first guide being connected relative to the upper member and defining an aperture for receiving the first tether line;
wherein the plurality of legs are configured to engage with a surface, on which the suspension assembly is installed, and elevate the at least one upper member and the first guide from the surface; and
at least one second guide for the first tether line, each said second guide being connected relative to an associated one of the legs and defining an aperture for receiving the first tether line.

Collapsibility of each of the legs may be facilitated by each of the legs being formed from a plurality of leg modules. The leg modules of each leg may be telescopically engaged with one another, articulated with one another or separable from one another.

Each of the legs may have a pivotable foot. Each said foot may be pivotable about a plurality of axes and/or configured with one or more apertures to facilitate fastening the foot to the surface.

An anchor point may be provided on said associated one of the legs for anchoring an end of the first tether line extending through the at least one second guide in a direction away from the first guide. In embodiments in which each of the legs has a pivotable foot, the foot of said associated one of the legs may be configured with the anchor point.

The at least one upper member may be collapsible. Collapsibility of the at least one upper member may be facilitated by the at least one upper member being formed from a plurality of upper member modules. The upper member modules may be telescopically engaged with one another, articulated with one another or separable from one another. The upper member modules may comprise: (i) a plurality of first upper member modules each fixedly connected to and extending laterally from a respective one of the legs; and (ii) an elongate second upper member module, the second upper member module releasably interconnecting the plurality of first upper member modules. In an embodiment, the suspension assembly may comprise four of the legs, wherein two of the legs are connected, via their associated said first upper member module, to one end of the second upper member module and the other two of the legs are connected, via their associated said first upper member module, to the other end of the second upper member module.

The at least one upper member may comprise an elongate support member that, in use, extends substantially horizontally at a position below an upper extremity of the legs, wherein the first guide is releasably connected to the elongate support member.

In use, the at least one upper member and the legs may define an A-frame structure.

In an embodiment, the suspension assembly may comprise: (i) a third guide for a second tether line, the third guide being connected relative to the upper member and defining an aperture for receiving the second tether line; and (ii) at least one fourth guide for the second tether line, each said fourth guide being connected relative to an associated one of the legs and defining an aperture for receiving the second tether line. An anchor point may be provided on the leg associated with the at least one fourth guide for anchoring an end of the second tether line extending through the at least one fourth guide in a direction away from the third guide. In an embodiment in which each of the legs has a pivotable foot, the foot of the leg associated with the at least one fourth guide may be configured with the anchor point for anchoring the end of the second tether line.

In an embodiment, the suspension assembly may comprise: (i) a fifth guide for a third tether line, the fifth guide being connected relative to the upper member and defining an aperture for receiving the third tether line; and (ii) at least one sixth guide for the third tether line, each said sixth guide being connected relative to an associated one of the legs and defining an aperture for receiving the third tether line. An anchor point may be provided on the leg associated with the at least one sixth guide for anchoring an end of the third tether line extending through the at least one sixth guide in a direction away from the fifth guide. In an embodiment in which each of the legs has a pivotable foot, the foot of the leg associated with the at least one sixth guide may be configured with the anchor point for anchoring the end of the third tether line.

In an embodiment, the suspension assembly may comprise: (i) a seventh guide for a fourth tether line, the seventh guide being connected relative to the upper member and defining an aperture for receiving the fourth tether line; and (ii) at least one eighth guide for the fourth tether line, each said eighth guide being connected relative to an associated one of the legs and defining an aperture for receiving the fourth tether line. An anchor point may be provided on the leg associated with the at least one eighth guide for anchoring an end of the fourth tether line extending through the at least one eighth guide in a direction away from the seventh guide. In an embodiment in which each of the legs has a pivotable foot, the foot of the leg associated with the at least one eighth guide is configured with the anchor point for anchoring the end of the fourth tether line.

In a direction from an operative top to an operative bottom of the legs, the legs may splay outwardly away from one another.

BRIEF DESCRIPTION OF DRAWINGS

A suspension assembly embodying principles disclosed herein will now be described, by way of example only, with reference to the accompanying drawings, in which.

DESCRIPTION OF EMBODIMENTS

Figure 1:
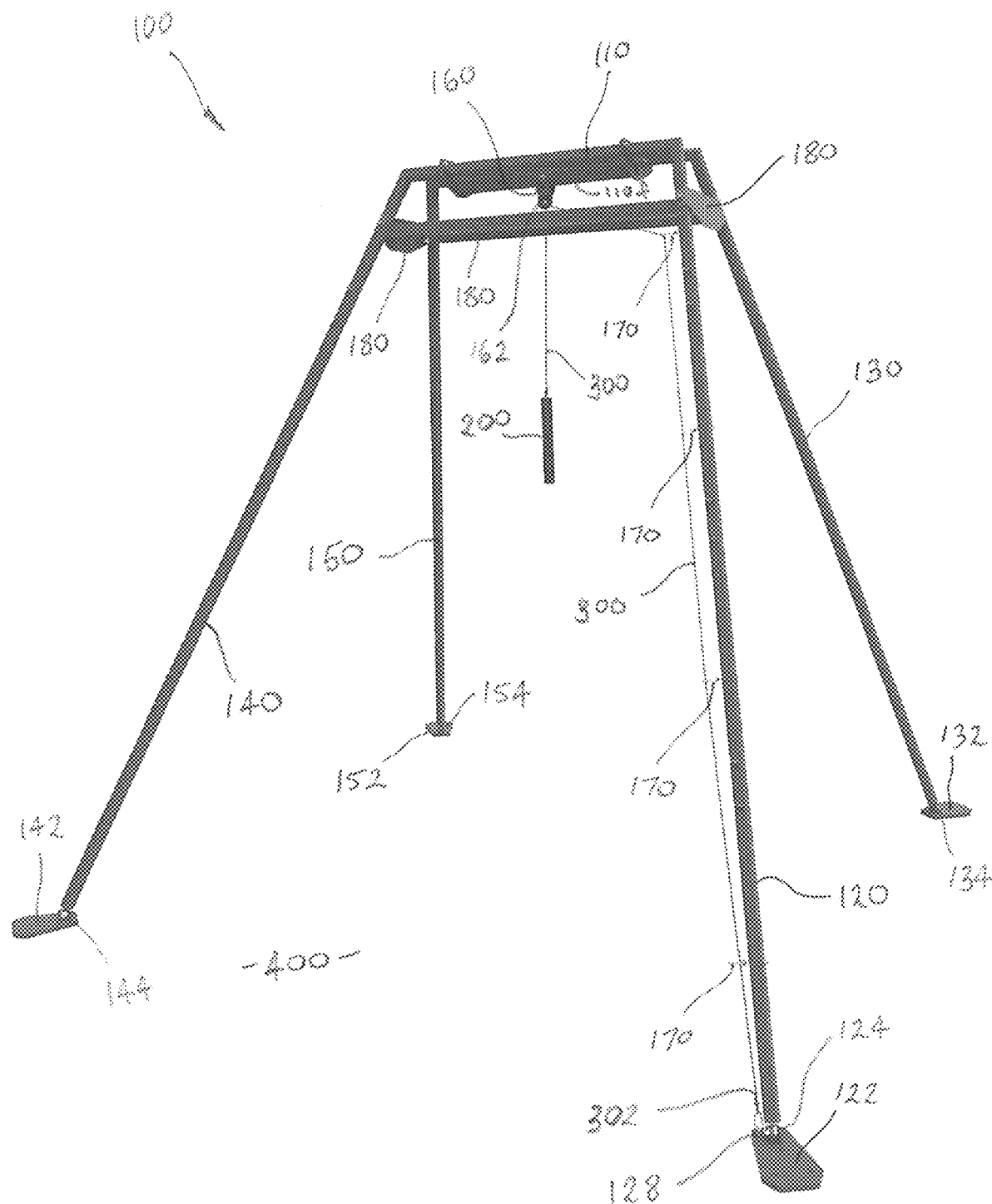
FIG. 1 is a perspective view of a suspension assembly for a tug toy.
Figure 2:
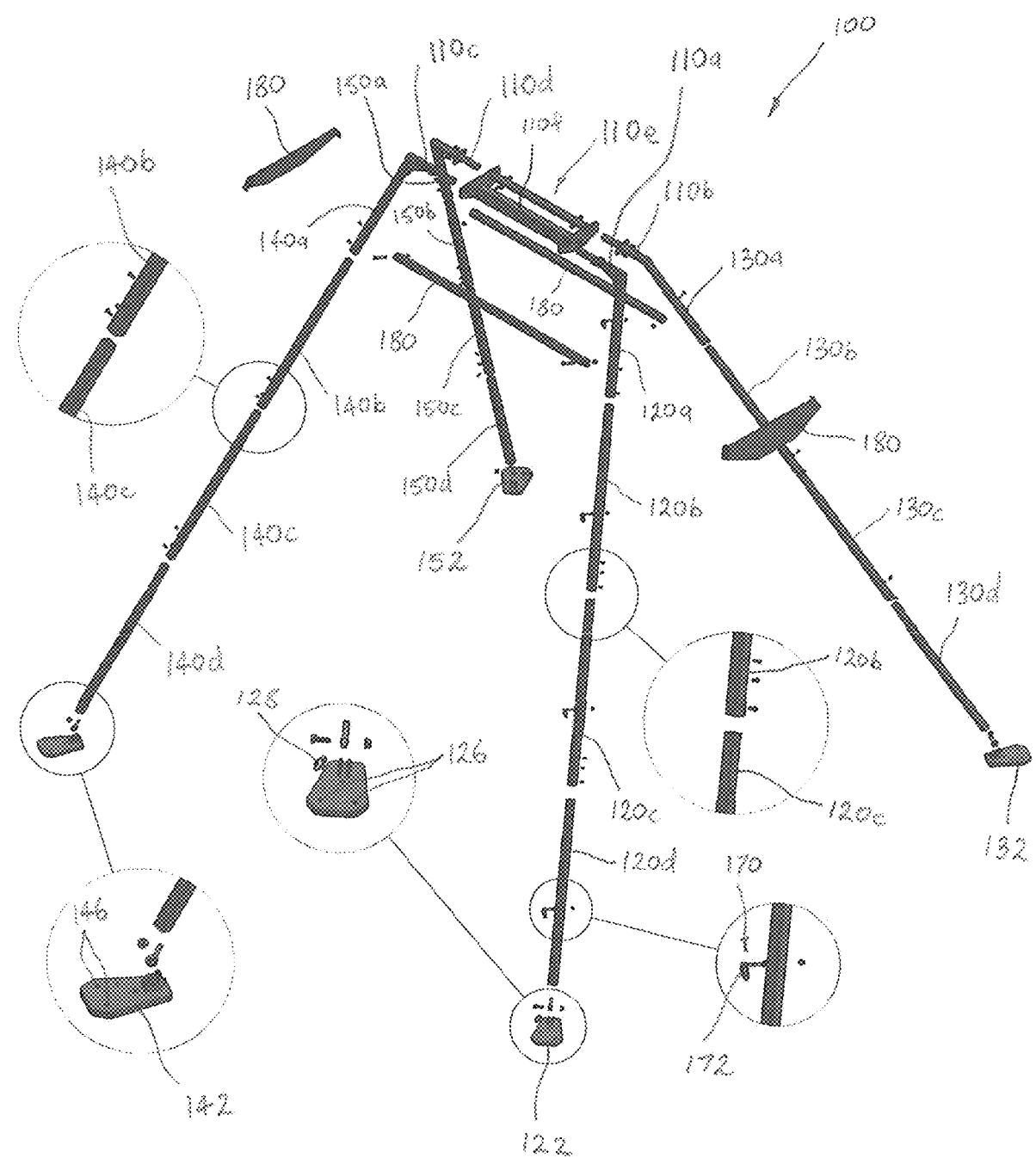
FIG. 2 is an exploded perspective view of the of the suspension assembly of FIG. 1.

FIGS. 1 and 2 illustrate a suspension assembly 100 for exercising and training animals, and especially canines using a suspended tug toy 200. The assembly 100 comprises an upper member 110 and a plurality of legs 120, 130, 140, 150 extending therefrom. Each of the plurality of legs is collapsible. In use, in a top to bottom direction of assembly 100, the legs splay outwardly away from one another for stability of assembly 100. Assembly 100 comprises one or more guide 160 for an associated tether line 300 for suspending tug toy 200. Guide 160 is connected relative to upper member 110 and defines an aperture 162 for receiving tether line 300. When assembly 100 is installed on a surface 400, such as natural ground or a manufactured platform, legs 120, 130, 140, 150 engage with the surface via an associated pivotable foot 122, 132, 142, 152 and elevate upper member 110 and guide 160 from surface 400. Guides 170 for tether line 300 are connected relative to leg 120 and define an aperture 172 for receiving tether line 300.

Each of legs 120, 130, 140, 150 is formed from a plurality of leg modules $120_{a-d}$, $130_{a-d}$, $140_{a-d}$, $150_{a-d}$ to facilitate collapsibility. In the illustrated embodiment, the leg modules of each leg are separable from one another. However, in other embodiments, the leg modules are, for example, telescopically engaged with one another or articulated with one another.

Each foot 122, 132, 142, 152 is connected to the lowermost leg module of the respective leg 120, 130, 140, 150 by a universal joint 124, 134, 144, 154, for example a ball and socket joint, such that each foot is pivotable about a plurality of axes. Each foot is configured with one or more aperture 126, 136, 146, 156 to facilitate fastening the foot to surface 400. In the illustrated embodiment, an anchor point 128 is provided on foot 122 for anchoring an end 302 of tether line 300 that extends through guides 170 in a direction away from guide 160. However, in other embodiments, anchor point 128 may, for example, be defined by one of guides 170 or may be provided at another location on leg 120.

Upper member 110 is formed from a plurality of upper member modules $110_{a-e}$ to facilitate collapsibility and improved structural capacity and stability. In the illustrated embodiment, upper member modules $110_{a-e}$ are separable from one another. However, in other embodiments, the upper member modules are, for example, telescopically engaged with one another or articulated with one another. Each of upper member modules $110_{a-d}$ is fixedly connected to and extends laterally from a respective one of leg modules $120_a$, $130_a$, $140_a$, $150_a$, each of these upper member module and leg module pairs defining a substantially L-shaped corner module. Upper member module $110_e$ is elongate and releasably interconnects upper member modules $110_a$, $110_b$, $110_c$, $110_d$ and leg modules $120_a$, $130_a$, $140_a$, $150_a$. Upper member module $110_e$ comprises an elongate support member $110_f$ that, in use, extends substantially horizontally at a position below an upper extremity of legs 120, 130, 140, 150. Guide 160 is releasably connected to the support member $110_f$. By having elongate support member $110_f$ and guide 160, in use, positioned at a position below an upper extremity of legs 120, 130, 140, 150, stability of assembly 100 is improved.

When assembled, upper member 110 and legs 120, 130, 140, 150 define an A-frame structure. Bracing members 180 interconnect respective pairs of legs 120, 130, 140, 150 to enhance rigidity and strength of assembly 100. In the illustrated embodiment, bracing members 180 extend between respective pairs of leg modules $120_a$, $130_a$, $140_a$, $150_a$.

It will be appreciated that assembly 100 provides a robust means for suspending a tug toy 200 for canine exercise, rehabilitation, training, including behavioural modification, or competitions. The modular nature of assembly 100 also facilitates its being readily disassembled and assembled, which thereby facilitates transport and storage of assembly 100 and its short term deployment and subsequent removal for events such as canine training courses or competitions. The arrangement of guides 160, 170 and anchor point 128, in which anchor point 128 is located remote from guide 160, also facilitates a user adjusting the height of tug toy 200, including lowering it to the ground, by untying tether line 300 from anchor point 128 whilst maintaining a safe distance between the user and tug toy 200. Maintaining such a safe distance is especially important if the user wishes to adjust the height of tug toy 200 whilst a canine is interacting with it.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of such variations or and/or modifications include, but are not limited to:

Apparatus 100 comprising two or more tether lines 300, each having an associated guide 160 connected to the upper member 110, associated guides 170 connected to a respective one of legs 120, 130, 140, 150 and an associated anchor point on the foot 122, 132, 142, 152 of the respective leg;

Upper member 110 being longer, for example to facilitate configuring apparatus 100 with additional guides 160 and associated tether lines; and/or Instead of having a rectangular cross sectional shape, tubular elements of apparatus 100 may have a different cross-sectional shape, such as a circular cross sectional shape.

The invention claimed is:

1. A suspension assembly for exercising and training animals, the suspension assembly comprising:
   at least one upper member;
   a plurality of legs extending from the at least one upper member, each of the plurality of legs being collapsible;
   a first guide for a first tether line, the first guide being connected relative to the upper member and defining an aperture for receiving the first tether line;
   wherein the plurality of legs are configured to engage with a surface, on which the suspension assembly is installed, and elevate the at least one upper member and the first guide from the surface; and
   at least one second guide for the first tether line, each said second guide being connected relative to an associated one of the legs and defining an aperture for receiving the first tether line.

2. The suspension assembly of claim 1, wherein collapsibility of each of the legs is facilitated by each of the legs being formed from a plurality of leg modules.

3. The suspension assembly of claim 2, wherein the leg modules of each leg are telescopically engaged with one another, articulated with one another or separable from one another.

4. The suspension assembly of claim 1, wherein each of the legs has a pivotable foot.

5. The suspension assembly of claim 4, wherein each said foot is configured with one or more apertures to facilitate fastening the foot to the surface.

6. The suspension assembly of claim 1, comprising an anchor point on said associated one of the legs for anchoring an end of the first tether line extending through the at least one second guide in a direction away from the first guide.

7. The suspension assembly of claim 1, comprising an anchor point on said associated one of the legs for anchoring an end of the first tether line extending through the at least one second guide in a direction away from the first guide, and wherein each of the legs has a pivotable foot, and wherein the foot of said associated one of the legs is configured with the anchor point.

8. The suspension assembly of claim 1, wherein the at least one upper member is collapsible, and wherein collapsibility of the at least one upper member is facilitated by the at least one upper member being formed from a plurality of upper member modules.

9. The suspension assembly of claim 8, wherein the plurality of upper member modules comprise:
   a plurality of first upper member modules each fixedly connected to and extending laterally from a respective one of the legs; and
   an elongate second upper member module, the second upper member module releasably interconnecting the plurality of first upper member modules.

10. The suspension assembly of claim 9, comprising four of the legs, wherein two of the legs are connected, via their associated said first upper member module, to one end of the second upper member module and the other two of the legs are connected, via their associated said first upper member module, to the other end of the second upper member module.

11. The suspension assembly of claim 1, wherein the at least one upper member comprises an elongate support member that, in use, extends substantially horizontally at a position below an upper extremity of the legs, and wherein the first guide is releasably connected to the elongate support member.

12. The suspension assembly of claim 1, wherein, in use, the at least one upper member and the legs define an A-frame structure.

13. The suspension assembly of claim 1, comprising:
   a third guide for a second tether line, the third guide being connected relative to the upper member and defining an aperture for receiving the second tether line; and
   at least one fourth guide for the second tether line, each said fourth guide being connected relative to an associated one of the legs and defining an aperture for receiving the second tether line.

14. The suspension assembly of claim 13, comprising an anchor point on the leg associated with the at least one fourth guide for anchoring an end of the second tether line extending through the at least one fourth guide in a direction away from the third guide.

15. The suspension assembly of claim 14, wherein each of the legs has a pivotable foot, and wherein the foot of the leg associated with the at least one fourth guide is configured with the anchor point for anchoring the end of the second tether line.

16. The suspension assembly of claim 1, wherein, in a direction from an operative top to an operative bottom of the legs, the legs splay outwardly away from one another.

* * * * *